(12) United States Patent
Belloni et al.

(10) Patent No.: US 6,429,405 B2
(45) Date of Patent: Aug. 6, 2002

(54) APPARATUS AND METHOD FOR WELDING PIPES TOGETHER

(75) Inventors: Antonio Belloni, Codogno; Renato Bonasorte, Ripalta Cremasca, both of (IT)

(73) Assignee: Saipem S.p.A., San Donato Milanese (IT)

( * ) Notice: Subject to any disclaimer, the term of this patent is extended or adjusted under 35 U.S.C. 154(b) by 0 days.

(21) Appl. No.: 09/848,215

(22) Filed: May 4, 2001

Related U.S. Application Data

(63) Continuation of application No. PCT/EP99/10505, filed on Dec. 2, 1999.

(30) Foreign Application Priority Data

Dec. 24, 1998 (GB) ............................................. 9828727

(51) Int. Cl.[7] ................................................ B23K 9/12
(52) U.S. Cl. ................ 219/124.34; 219/61; 219/125.11; 219/125.12
(58) Field of Search ................................ 219/60 A, 61, 219/124.22, 124.34, 125.11, 125.12

(56) References Cited

U.S. PATENT DOCUMENTS

| | | |
|---|---|---|
| 3,777,115 A | 12/1973 | Kazlauskas et al. |
| 3,800,116 A | 3/1974 | Tanaka et al. |
| 3,974,356 A * | 8/1976 | Nelson et al. .......... 219/125.11 |
| 4,145,593 A | 3/1979 | Merrick et al. |
| 4,151,395 A | 4/1979 | Kushner et al. |
| 4,283,617 A | 8/1981 | Merrick et al. |
| 4,350,868 A | 9/1982 | Takagi et al. |
| 4,373,125 A | 2/1983 | Kazlauskas |
| 4,380,695 A | 4/1983 | Nelson |

(List continued on next page.)

FOREIGN PATENT DOCUMENTS

| | | |
|---|---|---|
| EP | 0 021 856 | 1/1981 |
| EP | 0 076 018 | 4/1983 |
| EP | 0 402 648 | 12/1990 |
| EP | 0 439 975 | 8/1991 |
| EP | 0 706 849 | 4/1996 |
| EP | 0 852 984 | 7/1998 |
| GB | 2 100 642 | 1/1983 |
| JP | 59-191575 | 10/1984 |
| JP | 62-118976 | 5/1987 |
| NZ | 330 519 | 10/1998 |
| WO | WO91/09700 | 7/1991 |

OTHER PUBLICATIONS

Copy of International Search Report completed Mar. 10, 2000 and mailed Mar. 21, 2000.
Copy of UK Search Report dated Feb. 18, 1999.
Serimer DASA–Automatic Pipeline Welding, "Saturnax Dual–Torch Now we're talking".
R. A. Teale et al., "Development of pulsed GMAW for an advanced dual torch pipeline welding system", p12–1.

*Primary Examiner*—Clifford C. Shaw
(74) *Attorney, Agent, or Firm*—Burns, Doane, Swecker, & Mathis, L.L.P.

(57) ABSTRACT

Two pipes are arranged, when forming a deep sea pipeline, end to end thereby defining a circumferentially extending narrow angled (less than 10 degrees) groove. Two arc welding torches are arranged directly adjacent to each other on a single carriage that moves around the pipes, thereby forming a twin arc welding system. The position of the arc of each torch is independently oscillated between the walls of the groove to form a weld therein. The arcs are guided automatically by an electronic guidance system, wherein electrical characteristics (such as arc current voltage and/or impedance) of the welding of each torch with regard to one of the two pipes are compared with the corresponding electrical characteristics relating to the other of the pipes. The position of an arc of a torch may thus be aligned with the center line of the groove.

37 Claims, 3 Drawing Sheets

U.S. PATENT DOCUMENTS

Figure 1:
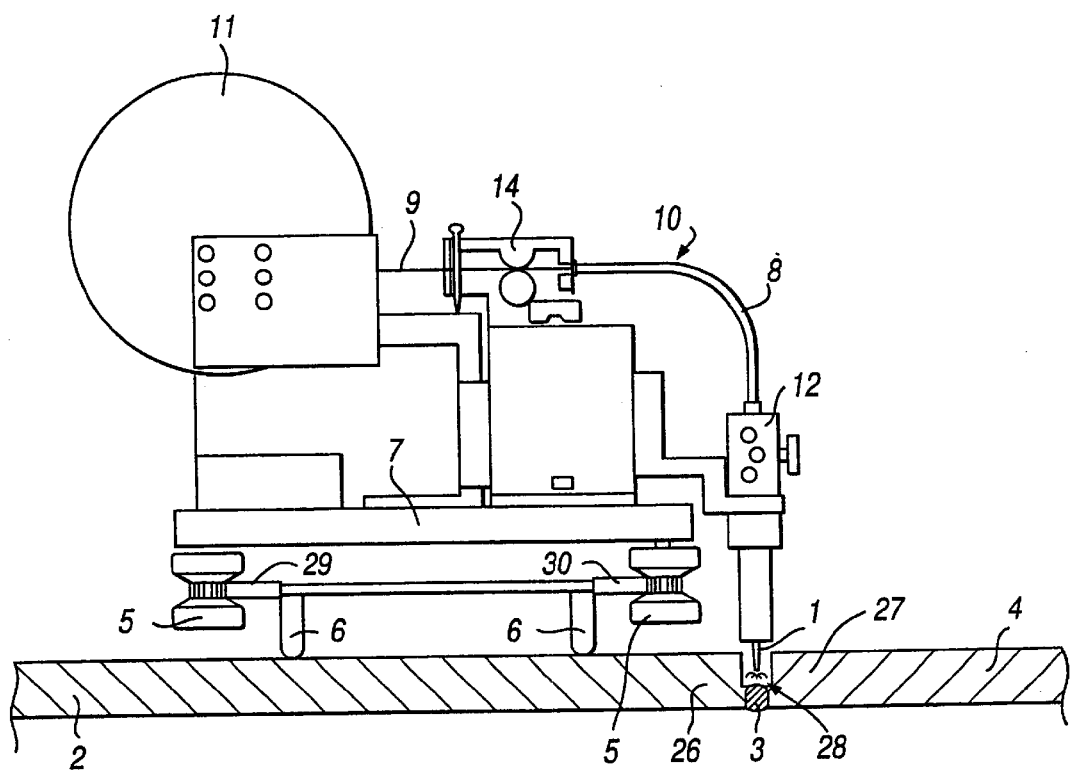

| | | |
|---|---|---|
| 4,417,126 A | 11/1983 | Kasahara et al. |
| 4,485,291 A | 11/1984 | Nomura et al. |
| 4,495,400 A | 1/1985 | Thompson |
| 4,525,616 A | 6/1985 | Slavens |
| 4,631,386 A | 12/1986 | Slavens |
| 4,990,743 A | 2/1991 | Kugai et al. |
| 5,030,812 A | 7/1991 | Sugitani et al. |
| 5,126,523 A * | 6/1992 | Rinaldi .................. 219/125.11 |
| 5,146,064 A | 9/1992 | Poirier |
| 5,347,101 A | 9/1994 | Brennan et al. |
| 6,124,566 A | 9/2000 | Belloni et al. ......... 219/124.34 |

* cited by examiner

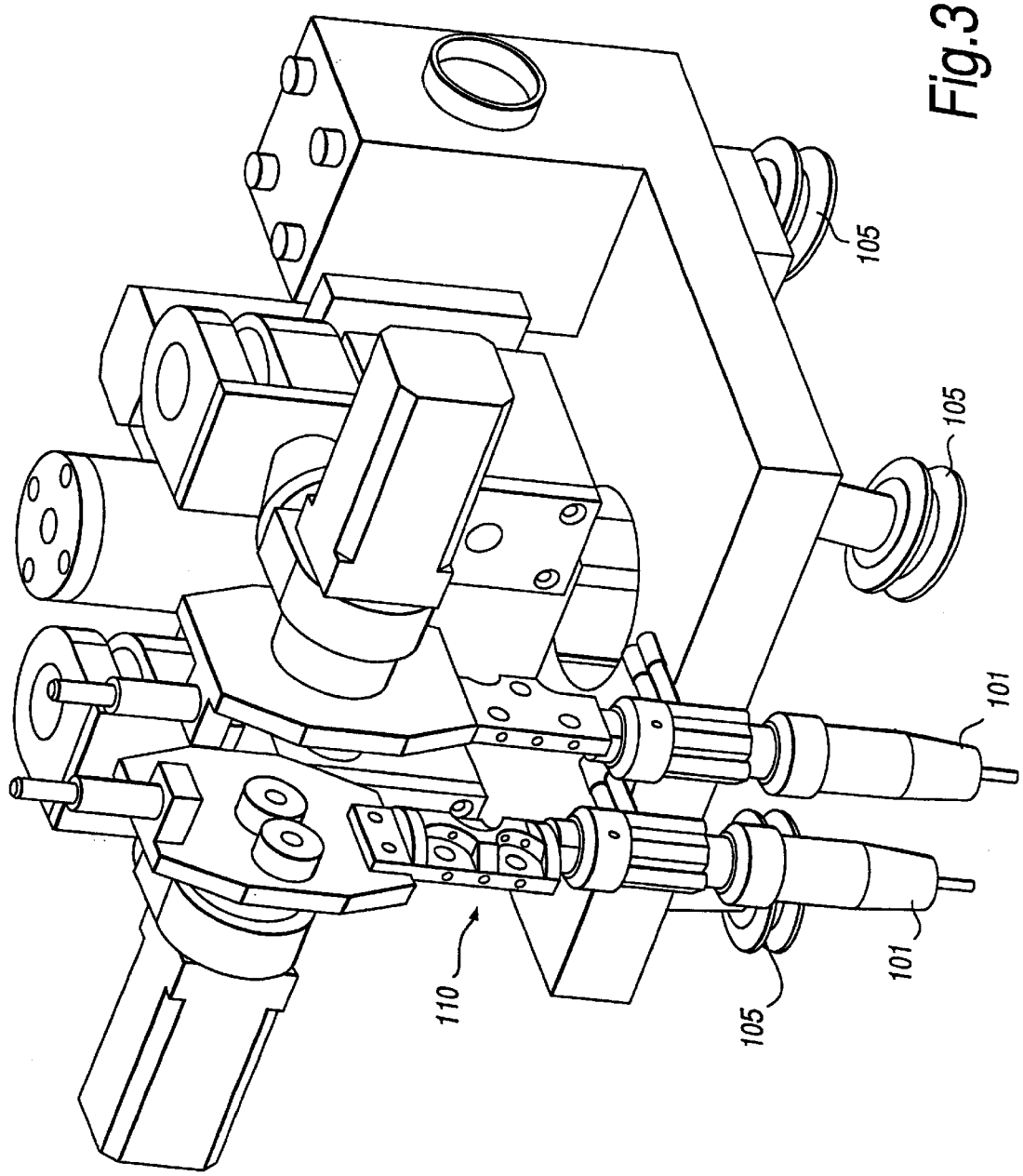

APPARATUS AND METHOD FOR WELDING PIPES TOGETHER

This application is a continuation of application Ser. No. PCT/EP99/10505, filed Dec. 2, 1999.

BACKGROUND OF THE INVENTION

1. Field of the Invention

The present invention relates to an apparatus and method for welding pipes together. More specifically the invention relates to arc-welding together pipe sections when laying pipelines. The pipelines may be underwater pipelines or inland pipelines. The welding process used when laying such pipelines is commonly of the type where a continuous-wire arc welding torch is used. The present invention is particularly, but not exclusively, concerned with a welding process used when laying pipelines underwater.

2. Description of the Related Art

When laying a pipeline at sea it is customary to weld, on a lay-barge, individual pipe sections to a pipe string (the pipe string leading towards the seabed). The welding process takes place close to the surface of the water. The pipe sections may consist of a plurality of pipe lengths each welded together on the lay-barge to form the pipe sections when required.

The pipe-string, when being laid, is under great tension and weld joints must, of course, necessarily be sufficiently strong to withstand the high forces imposed on the weld joints. Each time a pipe is welded to another pipe extensive tests are made to ensure that the quality of the weld joint formed is sufficient. The strength of a weld joint depends upon various factors, one being the geometry of the path traced by the point of contact of the arc in relation to the surfaces of the pipes to be joined. If the point of contact of the arc is off target by as little as a tenth of a millimeter the quality of the joint may be reduced by enough that the pipe joint is rejected, when tested, as not being of sufficient quality. It is therefore important that the weld metal is laid down in the region of the joint with great accuracy.

Furthermore the radial distance of the electrode with respect to the pipes must change in relation to the depth of the weld joint. As the region of the joint between the pipes is filled with welded metal the surface of the welded metal gets closer to the welding torch.

There are therefore special considerations that must be taken into account when designing an apparatus for welding such pipes together.

A known method of welding two pipes together may be described as follows. The pipes to be joined are prepared prior to the welding process by beveling the ends of the pipes such that when the pipes are arranged immediately before the welding process commences (coaxially with respect to each other), an exterior circumferential groove is defined between the two pipes. The pipes are positioned ready for welding. A carriage is mounted on one of the pipes for movement around the circumference of the pipes to be joined. A welding torch is mounted on the carriage and the apparatus is so arranged that the end of the metal electrode of the torch is opposite and relatively close to the circumferential groove. The carriage is moved around the circumference of the pipe and the torch is operated so that an arc is directed into the groove. The arc is guided manually and/or by various mechanical sensors to guide the arc as accurately as possible along the length of the groove. The welding process generally takes several passes.

In the above-described method the resolution of the mechanical sensors is such that a human operator is required to assist in the welding process for guiding the arc with sufficient accuracy.

The time it takes to lay a given length of pipeline is, to a great extent, determined by the time it takes to perform all the necessary welding operations. There has therefore been a general desire to reduce the time it takes to weld two pipes together. Any attempt to speed up the welding process should not however lead to a significant reduction in the quality of the weld joint.

SUMMARY OF THE INVENTION

An object of the present invention is to provide an apparatus and method for welding pipes together that mitigates at least some of the above-mentioned disadvantages associated with the known method and apparatus described above. A further object of the present invention is to provide an apparatus and method for welding pipes together that is faster at welding pipes together than the known method and apparatus described above but without significantly reducing the quality of weld joint.

Thus the present invention provides a welding apparatus for welding pipes together to form a pipeline comprising a carriage carrying a plurality of arc welding torches, a control unit for facilitating automatic guidance of the arcs produced by the torches, wherein the apparatus is so configured that it may be used to weld together two pipes laid end to end defining therebetween a groove, by arranging the apparatus so that the carriage is mounted for movement around the circumference of the pipes, the control unit receives signals representing electrical characteristics of the welding with regard to each pipe, respectively, whereby the control unit facilitates automatic guidance of the arc of each torch along the groove by comparing the signals relating to one of the pipes with the corresponding signals relating to the other of the pipes.

Both the automation of the process and the provision of a plurality of torches on the carriage facilitate the speeding of the welding process, whilst not necessarily significantly increasing the complexity or cost of the welding apparatus. Costs may also be reduced because there is no need for there to be a skilled operator for manually guiding the welding apparatus.

The present invention also provides a method of welding two pipes together, the method comprising the steps of arranging two pipes end to end, the pipes being so shaped that a circumferentially extending groove is defined between the ends of the pipes, effecting relative movement of a plurality of arc welding torches at substantially the same speed around the pipes and operating the torches so that their arcs form a weld in the groove, automatically guiding the arcs produced by the torches by ascertaining electrical characteristics of the welding with regard to each pipe, respectively, and comparing the electrical characteristics relating to one of the pipes with the corresponding electrical characteristics relating to the other of the pipes.

The present invention yet further provides a method of forming a deep sea pipeline or a cross country pipeline including a step of welding two pipes together, said step of welding two pipes together comprising the steps of arranging two pipes end to end, the pipes being so shaped that a circumferentially extending groove is defined between the ends of the pipes, the angle of separation of the walls defining the groove being less than 10 degrees, effecting relative movement of a plurality of arc welding torches arranged on a single carriage around the pipes and operating the torches so that their arcs form a weld in the groove, each torch being moved around the pipe with substantially the same component of velocity along the length of the groove, each torch being independently moved so that the respective positions of the arcs within the groove oscillate between the walls of the groove in a direction having a component parallel to the axis of the pipe, and automatically guiding the arc produced by each of the torches by ascertaining, in respect of an arc, electrical characteristics of the welding with regard to each pipe, respectively, and comparing the electrical characteristics relating to one of the pipes with the corresponding electrical characteristics relating to the other of the pipes.

When the torches are first operated to form a weld, it is preferable for a first torch to start welding and for other torches to start welding only once they have reached the position at which the first torch was started. The torches may be shut down in order in a similar manner.

Many proposals have been made in the past to speed up the welding process with which the present invention is concerned. One such proposal is to provide more than one welding apparatus, each welding apparatus being operated by a respective welding operator. However, such a proposal requires the provision of separate carriages, which leads to an increase in costs. Also, because it has been customary in the past for the circumferential groove between the pipes to be tapered it has also been customary for the speed of the welding torch relative to the pipe to be slowed down as the depth of the weld joint increases, because as the depth increases the width of the layer of the weld joint to be formed increases and therefore the time required to form successive layers (of a given length along the groove) also increases. Thus proposals of providing two carriages each carrying a torch often require the carriages to be able to travel independently of each other and at different speeds, which causes complications in that efforts must be made to avoid the carriage and torch assemblies disrupting and interfering with each other.

The automation of the guiding of the welding torches according to the present invention facilitates the provision of a plurality of such torches mounted on a single carriage. If the guiding of the torches were not fully automated, a plurality of operators might be required in respect of a single carriage. Furthermore the method of automatically guiding the torches according to the present invention does not require mechanical contact with the walls that define the groove and has been found to be highly accurate, which could lead to fewer welds being rejected, when subjected to the rigorous quality testing necessary when laying pipelines. Preferably, when the arcs are being moved along the length of the circumferential groove, the guidance of the arcs, insofar as the movement of the arcs in a direction along the axis of the pipe is controlled, is effected without any mechanical or optical sensors.

The guidance of the arcs can be, and preferably is, effected by a carriage moving circumferentially around the pipes and along the groove so that the torch points generally towards the groove and a control unit controls the exact position of the arcs by effecting correcting movements to the torch in a direction parallel to the axis of the pipe. Such correcting movements preferably, but not necessarily, move the arc to substantially the exact desired location.

Preferably, each arc is independently automatically electronically guided. Guiding each arc independently may facilitate the production of a higher quality weld joint.

Preferably the process of automatically guiding the arcs includes a step of ascertaining the difference between a value representing an electrical characteristic relating to one pipe and a value representing the same electrical characteristic relating to the other pipe and then performing a correcting movement in which the position of the arc is moved in dependence on the value of the difference. For example, the position of the arc may be moved a preset distance (for example, in a direction along the axis of the pipe) if the value of the difference is outside a predetermined range of acceptable values. The direction of the movement may depend on whether the value of the difference is above a high threshold value or below a low threshold value. The magnitude of the correcting movement could depend on the value of the difference.

The measurements, from which the values of the electrical characteristics compared are ascertained, are of course preferably taken with the arc being at substantially the same distance along the length of the groove.

If a correcting movement is only effected when the value of the difference falls outside an acceptable range of values it is preferable to have a further means of correcting the movement. If over time the value of the difference is indicative of the arc being continuously off position to one side of the desired path, but not by enough to cause the value of the difference to be outside the predetermined acceptable range, then it is nonetheless desirable to correct that small, but persistent discrepancy in the position of the arc. The method therefore preferably further comprises monitoring the values of the differences over time and if the values of the differences are indicative of the arc being substantially continuously to one side of the desired path a correcting movement of the arc is effected. For example an integrating device might be provided to calculate a running sum of the values of the calculated differences.

The electrical characteristics that are ascertained may include one or more of voltage, potential difference, current, current intensity and arc impedance. The characteristics are preferably ascertained by measuring electrical characteristics of the arcs of the welding torches.

The torches need not all be operated in the same manner. Some torches may be operated at different currents for example. Two of the torches effecting welding of the pipe, may weld at different rates. For example, one torch may be fed with welding wire at a different rate.

The separation between the respective arcs is advantageously less than a fifth (and preferably less than an eighth) of the circumference of the pipes. The torches are preferably arranged so that each torch is directly adjacent to another torch. Preferably the torches are so arranged that during the operation of the torches, the arcs are formed directly one after the other in the groove. The axes of the torches may be substantially parallel. For example, the axes of the torches may be arranged so that, in use, they each extend substantially radially with respect to the pipe.

A plurality of the welding torches are preferably mounted on a single carriage. Preferably, there are two welding torches mounted on the carriage. In that case, the arcs of the two welding torches are preferably immediately adjacent to each other.

Preferably each torch is a continuous wire arc welding torch. For example, in use, the wire is fed into the torch and, by means of the arc welding process, fills the groove between the pipes to form the weld joint. The supply of the wire is advantageously mounted remotely from the carriage. Having the supply of wire being remotely provided makes the carriage lighter and consequently easier to operate. The wire may be mounted on a spool. A typical spool of wire can weigh about 2.5 Kg.

The automatic electronic guidance of the welding enables the method of the present invention to be used to weld pipes together, where the angled groove between the pipes is relatively narrow. For example, the angle of separation of the walls defining the groove may be less than 10 degrees. The angle of separation of the walls defining the groove is advantageously 6 degrees or less. Generally, the narrower the angle, the less weld material is required to weld the pipes together satisfactorily. The walls defining the groove may even be substantially parallel.

Preferably, each torch is movable independently in a direction having a component parallel to the axis of the pipe.

A suitable method of ascertaining the necessary values of the electrical characteristics relating to each respective pipe is described below. A step of that method preferably includes oscillating each welding torch so that the position of each arc alternatively moves from one side to the other of the general path being traced along the groove by each respective torch. The torches are thus preferably moved so that the respective positions of the arcs within the groove oscillate between the walls defining the groove. Each welding torch is preferably oscillated so that the position of each arc alternatively moves generally towards and away from the walls of the groove. The oscillatory movement of each arc is preferably in a direction having a component in a direction along the axis of the pipe. Preferably, the direction of the oscillatory movement is substantially perpendicular to the length of the groove. Preferably, the direction of the oscillatory movement is substantially parallel to the axis of the pipe. The oscillatory movement of the arcs towards and away from the walls of the groove is advantageously small in comparison to the width of the weld layer being deposited at a given time. The amplitude of the oscillatory movement is advantageously so small that the quality of the weld being formed is not significantly affected. For example, the amplitude of the oscillations of the arc may, during at least some stage in the welding process, be less than a tenth of a millimeter.

As indicated above, the step of ascertaining the electrical characteristics of the welding with regard to each pipe preferably includes a step of oscillating the position of the arcs in the groove. Since the electrical characteristics of an arc change in dependence upon the relative position of the arc in the groove, an indication of the position of the arc within the groove can be ascertained, by observing and comparing the electrical characteristics of the arc, as the distance of the arc from the walls changes.

The movement of each torch in said direction having a component parallel to the axis of the pipe is preferably driven by a respective independent prime mover. A single prime mover preferably effects motion of the torches along the length of the groove. The or each prime mover may be an electric motor, preferably a brushless electric motor.

Advantageously, each torch is cooled during operation. In that case, each torch may be provided with means for cooling the torch during operation. When a torch is operated in close proximity to another torch that is also being operated the excessive amount of heat generated by the two torches can cause mechanical problems to the torches or other apparatus in the vicinity, if the heat is not properly dissipated. Preferably the torches are each water cooled. Preferably the water cooling system of a torch effects cooling of the welding tip of that torch.

The present invention also provides a method of constructing a pipeline including using the method or apparatus according to the present invention as described herein. The pipeline may be an underwater pipeline. The technique used in laying the underwater pipeline may be the J-lay method.

If the above-described invention is used to connect a pipe section to a pipeline one of the two pipes will be the pipe section and the other will of course be the free end of the pipeline to which the pipe section is to be connected. Whilst in the case where a pipe section is to be welded to a pipeline it is necessary for the pipe section to be prevented from rotating, at least some of the features of the present invention can, of course, also be of use when welding pipes together, such as for example when welding pipe lengths together to form a pipe section, where it is possible for the pipes to rotate and for the welding apparatus to remain stationary.

The invention also provides a method as described above, wherein the pipes are of a size and have a wall thickness suitable for forming a deep sea pipeline or a cross country pipeline, and the pipes are joined by butt welding effected by an automatically guiding welding apparatus, the method comprising the steps of arranging coaxially two pipes to be joined next to each other, the end walls of the pipes facing each other defining a circumferentially extending bevelled groove having a left wall and a right wall, providing a welding apparatus including a guide mounted around the circumference of the pipe, at least one automatic tracking trolley mounted on the guide for movement therealong and around the pipe under the control of a control unit, the or each trolley comprising locking and sliding devices engageable with the guide, and pulling units for pulling the or each trolley along the guide, two continuous-wire oscillating welding torches mounted on the or each trolley, and a wire feeding means for feeding wire to each oscillating welding torch, moving the welding torches around the guide and operating the torches to effect welding of the left wall and right wall of the groove to weld the pipes together, in respect of each torch, ascertaining, at each of a multiplicity of instants over time, electrical parameter values relating to the voltage, current intensity and voltaic arc impedance of both the left wall and the right wall of the groove during the continuous movement of the oscillating torches, in respect of each torch, calculating the difference between the electrical parameter values for the right wall and for the left wall, in respect of each torch, comparing the values of the differences calculated, at each instant, with preset values held in a processing means to determine, at each instant, the shifting of those values, piloting the variation in the movements of each oscillating welding torch by activating, each time the shifting in relation to the respective torch exceeds a preset limit, a drive means for orienting the torch so that the welding run is deposited in the center of the throat of the groove and then substantially superimposing the welding run on the notional central line of the groove, and providing a protective atmosphere of active carbon dioxide gas, whereby pipes with walls that are relatively thick and so beveled that the angle between the left and right walls of the groove defined between the ends of the pipes is relatively low may be quickly welded together in an economical manner.

According to the invention there is also provided a welding apparatus for welding pipes together to form a pipeline comprising a carriage carrying a plurality of arc welding torches, a control unit for facilitating automatic guidance of the arcs produced by the torches, wherein the apparatus is so configured that it may be used to weld together two pipes laid end to end defining therebetween a groove, by arranging the apparatus so that the carriage is mounted for movement around the circumference of the pipes, the control unit receives signals representing electrical characteristics of the welding with regard to each pipe, respectively, whereby the control unit facilitates automatic guidance of the arc of each torch along the groove by comparing the signals relating to one of the pipes with the corresponding signals relating to the other of the pipes. The apparatus may, of course, be so configured that it is suitable for use in a method according to any aspect of the present invention as described herein. For example, the apparatus may be so configured that in use each arc may be independently automatically electronically guided. In that case, each torch is preferably provided with a respective control unit. Further examples of how the apparatus may be configured to perform an aspect of the method of the present invention include each welding torch preferably being so arranged that it is able in use to effect an oscillatory movement of the arc and each welding torch preferably being able to be oscillated so that, in use, the position of each arc alternatively moves generally towards and away from the walls of the groove.

The invention further provides a carriage for use in the above-described apparatus and method invention, which carriage may or may not include a welding torch. The carriage may include means for mounting a plurality of torches. Preferably, the carriage has a plurality of welding torches mounted thereon. The carriage may include one or more control units as described herein.

The present invention also provides a welding apparatus for welding pipes together to form a pipeline comprising a carriage carrying a plurality of arc welding torches, wherein the apparatus is so configured that it may be used to weld together two pipes laid end to end that define a groove therebetween, by arranging the apparatus so that the carriage is mounted for movement around the circumference of the pipes. Advantageously, there is also provided a control unit for facilitating automatic guidance of the arcs produced by the torches. Preferably the automatic guidance of the arcs is effected by measuring electrical characteristics of the arcs.

The automation of the guidance of the torches on a carriage, as described above, could of course have use in welding apparatuses where only one welding torch is provided on the carriage. Accordingly the present invention also provides an apparatus as described above, but instead of having a plurality of torches mounted on the carriage, the carriage has only one torch.

As will be appreciated, features of one or more of the above described apparatuses and methods of the invention can be incorporated into other apparatuses and methods of the invention.

BRIEF DESCRIPTION OF THE DRAWING FIGURES

Figure 2:
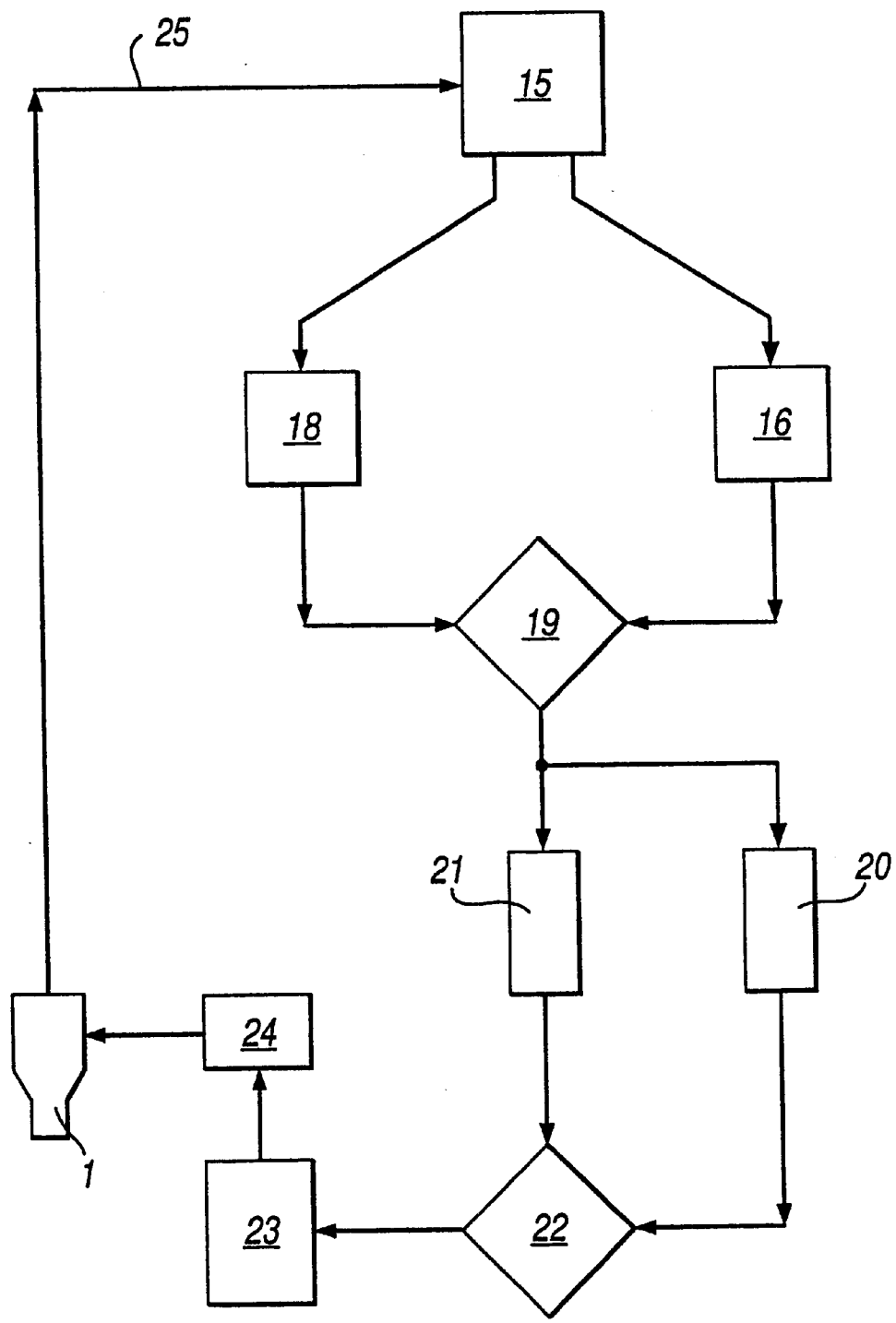

Embodiments of the present invention will now be described, by way of example, with reference to the accompanying drawings of which:

FIG. 1. is a schematic side view of a welding apparatus including two welding torches (only one of which is shown for the purpose of clarity) according to a first embodiment of the present invention;

FIG. 2. is a schematic block diagram illustrating the automatic guidance system of the welding apparatus of the first embodiment; and FIG. 3. is a schematic perspective view of a welding apparatus including two welding torches according to a second embodiment of the present invention.

DETAILED DESCRIPTION OF THE PREFERRED EMBODIMENTS

FIG. 1 shows in partial cross-section the ends of the pipes 2, 4 to be welded together and a schematic side view of a welding apparatus 10 having two voltaic arc-welding torches 1 (only one of which can be seen in FIG. 1) for butt welding the pipes 2, 4 together. The welding torch is of the well known GMAW (gas metal arc welding) and can either be of the type used in MAG (metal active gas) welding or of the type used in MIG (metal inert gas) welding. The gas used may for example be carbon dioxide.

The pipes 2, 4 are arranged with their axes aligned and their ends 26, 27 next to each other. The ends 26, 27 of the pipes are bevelled so that when brought together they define a circumferentially extending exterior groove 28.

A track 6 is fixedly mounted as a single unit on the left hand pipe 2 (as viewed in FIG. 1). The track 6 extends circumferentially around the pipe 2. The track 6 has two guide tracks 29, 30 that extend around the pipe 2. The welding apparatus 10 is mounted for movement along the track 6. Wheels 5 are rotatably mounted on a base plate 7 of the welding apparatus 10. The wheels 5 engage with the guide tracks 29, 30 and facilitate the guided movement of the apparatus 10 along the track 6. One of the tracks 30 also provides a toothed rack that extends around the pipe. A pinion wheel (not shown), mounted for engagement with the rack, is driven so that the apparatus may be driven around the pipe 2. The driven pinion wheel may be rotated via a driven chain, which is in turn driven by a stepper motor, or similar driving source (not illustrated). The track 6 is so positioned on the pipe 2 that the torches 1 of the apparatus 10 are each positioned directly over the groove 28. Such methods of positioning a track and a welding apparatus on a pipe so that a torch of the welding apparatus is correctly positioned over the weld joint to be formed are well known and are therefore not described here in further detail.

In use, the apparatus 10 is driven around the pipes 2, 4 and the welding torches 1 are operated and controlled so that they deposit weld material in the centre of the groove 28 to form a weld joint 3. The weld torches are arranged next to each other. When the apparatus is started up the first torch (the torch at the front in respect of the initial direction of motion of the torches) is operated first and the other torch is not operated until it reaches the start of the weld laid down by the first torch. Then, as the apparatus 10 passes along the groove 28, weld material is deposited in the groove by the first torch to form the weld joint 3 and shortly thereafter further weld material is deposited on top of the weld joint 3 by the second torch. The apparatus 10 performs several passes depositing further layers of weld material in the groove to join the pipes together. The welding apparatus 10 rotates in both directions around the circumference of the pipes 2, 4. The welding apparatus 10 moves around the pipes 2, 4 in one direction (i.e. clockwise or anticlockwise) until it has moved around the entire circumference of the pipes at least once.

Both torches 1 function in a similar way. The following description relates to only one of the two torches and its guidance system, but it will be understood that the other torch functions in substantially the same way.

Welding wire 9 is continuously fed from a spool 11 of wire to the torch 1. The welding wire 9 is unwound from the wire spool 11 by means of a pulling device 14 which conveys the wire 9 via a guiding pipe 8 to a straining device 12, from where the wire is fed into the torch 1.

The welding of the pipes 2 and 4, by the welding torch is controlled by an automatic guidance system. The guidance system guides the welding torch by ascertaining electrical parameter values relating to the voltaic arc impedance. The arc impedance depends on, inter alia, the position of the welding arc in relation to the walls defining the groove 28. If the arc lies in the notional central plane (containing the centre line of the groove 28) halfway between the walls of the groove 28, then the influence of those walls on the above electrical parameters is practically identical. On the other hand, if the arc of the voltaic torch 1 is not positioned directly in the centre of the groove 28 the influence of the walls of the groove on the electrical parameter values will be different. Monitoring the magnitudes of an electrical parameter ascertained enables the control unit (not shown in FIG. 1) of the apparatus to calculate the deviation from the central position of the arc of the torch 1 in the groove 28. More specifically the magnitude of the values of voltage, current and impedance (V, I, R) relating to one wall of the groove 28 are compared with those relating to the other wall of the groove, during the continuous movement of the torch 1. The voltage and current of the arc is measured with equipment attached to or in the welding torch and the arc impedance can then be calculated using those measured values. The method of ascertaining those values in respect of a given wall of the groove 28 is explained below with reference to FIG. 2.

If the arc is in an off-centre position, in that the arc, the end of the wire 9 and welding bath are closer to one of the walls of the groove there will be a decrease in the voltaic arc impedance with respect to the opposite wall, since the welding apparatus is such that the voltage value is caused to decrease and the current intensity is caused to increase. Corrections in the orientation and position of the torch 1 in relation to the groove 28 and the weld 3 are achieved with the automatic guidance system in real time.

The block diagram of FIG. 2 illustrates schematically the automatic guidance system of the welding apparatus according to the first embodiment (illustrated by FIG. 1) of the present invention. Each torch is provided with a guidance system, but the system is illustrated and described with reference to a single torch only for the sake of simplicity.

The guidance system periodically ascertains the electrical parameter values of voltage, current intensity and voltaic arc impedance relating to the right wall and left wall which define the groove 28 (see FIG. 1). The welding torch is oscillated so that the position of the arc oscillates with a small amplitude in a direction substantially parallel to the axis of the pipe (so that the arc moves towards and away from each wall). The arc voltage and current are measured practically continuously and signals corresponding to those measured values are passed from the torch 1 via a cable 25 to a governing unit 15. The governing unit 15 includes a processing means, which processes the signals. The governing unit 15 sends signals representative of the electrical parameter values measured for the left and right walls to two digital filters 16, 18, one filter 16 for generating signals relating to the right wall and one filter 18 for the left wall. The governing unit 15 and filters 16, 18 are thus able effectively to extract, from the signals from the torch 1, signals corresponding to values of the parameters measured in respect of the arc in relation to the left wall and right wall, respectively, of the groove 28. Output signals are thus produced by the filters 16, 18 relating to the voltage, current and impedance values relating to their respective wall of the groove.

A difference unit 19 calculates an indication of the position in the groove of the arc of the torch by calculating the differences in the values relating to the left and right walls respectively, determined from the signals received from the filters 16, 18. The calculations, which are made practically continuously, are used in real time for controlling the position and orientation of the torch 1 in relation to the groove 28.

If the calculations made, indicate that the difference in desired position of the arc and the actual position of the arc is greater than a fixed and preset threshold distance, then a signal is generated which causes a gain unit 21 to activate a command signal, which by means of an amplifier 22, causes a drive unit 23 in association with a centring regulation unit 24 to move the welding torch 1, so that the arc is moved towards the desired location (the centre line of the groove).

If the calculations made (by the difference unit 19) indicate that the difference in desired position of the arc and the actual position of the arc is less than or equal to the preset threshold distance, the gain unit 21 does not cause the torch to be moved. However signals representing the difference values calculated by the difference unit 19 are sent to an integrator unit 20 that is also provided to regulate the positioning of the torch 1 during the welding process. If the position of the arc remains near the central line of the groove 28, and the sum of the distances to the left of the line is practically equal, over time, to the sum of the distances to the left of the line the integrator 20 will not generate any centring movement command signal through the amplifier 22. However, if the position of the arc, although remaining within the tolerated range of distances from the central line of the groove, is found to be prevalently to one side of the line, then the integrator 20 activates a command signal, which by means of the amplifier 22, causes the drive unit 23 and centring regulation unit 24 to move the welding torch 1, so that the arc is moved towards the desired location (the centre line of the groove).

The calculations performed by the automatic guidance system may include performing comparisons between calculated values relating to the actual state of the welding system and sample values held in the memory of the guidance system. Such sample values may be entered into the memory manually by keyboard.

FIG. 3 shows schematically a welding apparatus 110 according to a second embodiment of the present invention in perspective view. The apparatus operates in a similar manner to that of the first embodiment described above. The welding torches 101 are aligned so that when the apparatus 110 is mounted on a pipe (not shown in FIG. 3) they both point towards the same notional circumferential line extending around the pipe. Wheels 105 are provided for engaging with a guide track (not shown in FIG. 3) that, in use, extends around one of the pipes to be welded.

The main differences between the apparatus according to the second embodiment and that of the first embodiment will now be described.

The welding wire (not shown) of the second embodiment is not provided on the movable welding apparatus 110, rather it is mounted at a location remote from the apparatus, and fed from that remote location, via a guide pipe, to the welding apparatus as it moves around the pipe. It is therefore useful that the apparatus is able to move both clockwise and anticlockwise around the pipe, to reduce the chance of the welding wire becoming twisted.

The torches 101 are each water cooled. The water is pumped around a cooling system (not shown) including parts of the torch. The water heated by the operating torch passes into a heat exchanger, such as a radiator, so that it is cooled.

We claim:

1. A method of forming a deep sea pipeline or a cross country pipeline including a step of welding two pipes together, said step of welding two pipes together comprising the steps of:

arranging two pipes end to end, the pipes being so shaped that a circumferentially extending groove is defined between the ends of the pipes, the angle of separation of the walls defining the groove being less than 10 degrees, effecting relative movement of a plurality of arc welding torches arranged on a single carriage around the pipes and operating the torches so that their arcs form a weld in the groove, each torch being moved around the pipe with substantially the same component of velocity along the length of the groove, each torch being independently moved so that the respective positions of the arcs within the groove oscillate between the walls of the groove in a direction having a component parallel to the axis of the pipe, and automatically guiding the arc produced by each of the torches by ascertaining, in respect of an arc, electrical characteristics of the welding with regard to each pipe, respectively, and comparing the electrical characteristics relating to one of the pipes with the corresponding electrical characteristics relating to the other of the pipes.

2. The method according to claim 1, including the step of ascertaining the difference between a value representing an electrical characteristic relating to one pipe and a value representing the same electrical characteristic relating to the other pipe and then performing a correcting movement moving the position of the arc in dependence on the value of the difference.

3. The method according to claim 2, wherein a correcting movement is effected when the value of the difference falls outside an preset acceptable range of values.

4. The method according to claim 3, further comprising monitoring the values of the differences over time and if the values of the differences is indicative of the arc being substantially continuously to one side of the desired path effecting a correcting movement of the arc.

5. The method according to claim 1, wherein the electrical characteristics that are ascertained include one or more of the arc voltage, the current, and the arc impedance.

6. The method according to claim 1, wherein two of the torches effecting welding of the pipe, weld at different rates.

7. The method according to claim 1, wherein the separation between the respective arcs is less than a fifth of the circumference of the pipes.

8. The method according to claim 1, wherein the torches are arranged so that each torch is directly adjacent to another torch.

9. The method according to claim 1, wherein each torch is a continuous wire arc welding torch and the supply of the wire is mounted remotely from the carriage.

10. The method according to claim 1, wherein the angle of separation of the walls defining the groove is 6 degrees or less.

11. The method according to claim 1, wherein the walls defining the groove are substantially parallel.

12. The method according to claim 1, wherein the movement of each torch in said direction having a component parallel to the axis of the pipe is driven by a respective independent prime mover.

13. The method according to claim 1, wherein a single prime mover effects motion of the torches along the length of the groove.

14. The method according to claim 1, wherein each torch is cooled during operation.

15. The method according to claim 14, wherein the torches are water cooled.

16. The method according to claim 1, wherein the pipes are of a size and have a wall thickness suitable for forming a deep sea pipeline or a cross country pipeline, and the pipes are joined by butt welding effected by an automatically guiding welding apparatus, the method comprising the steps of arranging coaxially two pipes to be joined next to each other, the end walls of the pipes facing each other defining a circumferentially extending bevelled groove having a left wall and a right wall, providing a welding apparatus including a guide mounted around the circumference of the pipe, at least one automatic tracking trolley mounted on the guide for movement therealong and around the pipe under the control of a control unit, the or each trolley comprising locking and sliding devices engageable with the guide, and pulling units for pulling the or each trolley along the guide, two continuous-wire oscillating welding torches mounted on the or each trolley, and a wire feeding means for feeding wire to each oscillating welding torch, moving the welding torches around the guide and operating the torches to effect welding of the left wall and right wall of the groove to weld the pipes together, in respect of each torch, ascertaining, at each of a multiplicity of instants over time, electrical parameter values relating to the voltage, current intensity and voltaic arc impedance of both the left wall and the right wall of the groove during the continuous movement of the oscillating torches, in respect of each torch, calculating the difference between the electrical parameter values for the right wall and for the left wall, in respect of each torch, comparing the values of the differences calculated, at each instant, with preset values held in a processing means to determine, at each instant, the shifting of those values, piloting the variation in the movements of each oscillating welding torch by activating, each time the shifting in relation to the respective torch exceeds a preset limit, a drive means for orienting the torch so that the welding run is deposited in the center of the throat of the groove and then substantially superimposing the welding run on the notional central line of the groove, and providing a protective atmosphere of active carbon dioxide gas, whereby pipes with walls that are relatively thick and so beveled that the angle between the left and right walls of the groove defined between the ends of the pipes is relatively low may be quickly welded together in an economical manner.

17. A method of welding two pipes together, the method comprising the steps of:

arranging two pipes end to end, the pipes being so shaped that a circumferentially extending groove is defined between the ends of the pipes, effecting relative movement of a plurality of arc welding torches at substantially the same speed around the pipes and operating the torches so that their arcs form a weld in the groove, automatically guiding the arcs produced by the torches by ascertaining electrical characteristics of the welding with regard to each pipe, respectively, and comparing the electrical characteristics relating to one of the pipes with the corresponding electrical characteristics relating to the other of the pipes, wherein each arc is independently automatically electronically guided.

18. The method according to claim 17, wherein a plurality of welding torches are mounted on a single carriage.

19. The method according to claim 17, wherein the angle of separation of the walls defining the groove is less than 10 degrees.

20. The method according to claim 17, in each torch is movable independently in a direction having a component parallel to the axis of the pipe.

21. The method according to claim 17, wherein the torches are moved so that the respective positions of the arcs within the groove oscillate between the walls in a direction having a component parallel to the axis of the pipe.

22. A welding apparatus for welding pipes together to form a pipeline comprising a carriage carrying a plurality of arc welding torches, a control unit for facilitating automatic guidance of the arcs produced by the torches, wherein the apparatus is so configured that it may be used to weld together two pipes laid end to end defining therebetween a groove, by arranging the apparatus so that the carriage is mounted for movement around the circumference of the pipes, the control unit receives signals representing electrical characteristics of the welding with regard to each pipe, respectively, whereby the control unit facilitates automatic guidance of the arc of each torch along the groove by comparing the signals relating to one of the pipes with the corresponding signals relating to the other of the pipes, wherein each arc is independently automatically electronically guided.

23. The welding apparatus according to claim 22, wherein each torch is provided with a respective control unit.

24. A welding apparatus for welding pipes together to form a pipeline comprising a carriage carrying a plurality of arc welding torches, a control unit for facilitating automatic guidance of the arcs produced by the torches, wherein the apparatus is so configured that it may be used to weld together two pipes laid end to end defining therebetween a groove, by arranging the apparatus so that the carriage is mounted for movement around the circumference of the pipes, the control unit receives signals representing electrical characteristics of the welding with regard to each pipe, respectively, whereby the control unit facilitates automatic guidance of the arc of each torch along the groove independently by comparing the signals relating to one of the pipes with the corresponding signals relating to the other of the pipes, wherein the apparatus is so configured that it is suitable for use in a method of welding two pipes together according to claim 17.

25. A welding apparatus for welding pipes together to form a pipeline comprising a carriage carrying a plurality of arc welding torches, a control unit for facilitating automatic guidance of the arcs produced by the torches, wherein the apparatus is so configured that it may be used to weld together two pipes laid end to end defining therebetween a groove, by arranging the apparatus so that the carriage is mounted for movement around the circumference of the pipes, the control unit receives signals representing electrical characteristics of the welding with regard to each pipe, respectively, whereby the control unit facilitates automatic guidance of the arc of each torch along the groove independently by comparing the signals relating to one of the pipes with the corresponding signals relating to the other of the pipes, wherein the apparatus is so configured that it is suitable for use in a method of forming a deep sea pipeline or a cross country pipeline according to claim 1.

26. A carriage mountable for movement around pipes to be welded together, wherein a plurality of welding torches are mounted on the carriage so that, in use, the torches may be moved along a groove defined between the pipes to be welded together so that the arcs of the torches form a weld in the groove, the torches being independently movable so that in use the respective positions of the arcs within the groove oscillate between the walls defining the groove in a direction having a component parallel to the axis of the pipes, and the torches and carriage being so arranged that in use the arc produced by each of the torches is automatically guided by ascertaining, in respect of an arc, electrical characteristics of the welding with regard to each pipe, respectively, and comparing the electrical characteristics relating to the other of the pipes, whereby the carriage is suitable for use in the method of claim 1.

27. A method of forming a deep sea pipeline or a cross country pipeline including a step of welding two pipes together, said step of welding two pipes together comprising the steps of arranging two pipes end to end, the pipes being so shaped that a circumferentially extending groove is defined between the ends of said pipes, the angle of separation of the walls defining said groove being less than 10 degrees, effecting relative movement of a plurality of arc welding torches at substantially the same speed around said pipes and operating said torches so that their arcs form a weld in said groove, at least two of said torches being so arranged that each torch is directly adjacent to another torch, automatically guiding the arcs produced by said torches by ascertaining electrical characteristics of the welding with regard to each pipe, respectively, and comparing the electrical characteristics relating to one of the pipes with the corresponding electrical characteristics relating to the other of the pipes.

28. A method of forming a deep sea pipeline or a cross country pipeline including a step of welding two pipes together, said step of welding two pipes together comprising the steps of arranging two pipes end to end, the pipes being so shaped that a circumferentially extending narrow groove is defined between the ends of said pipes, the angle of separation of the walls defining said groove being less than 6 degrees, providing a carriage and a plurality of GMAW (Gas Metal Arc Welding) torches arranged directly adjacent to one another on said carriage, effecting relative movement of said carriage around said pipes and operating said torches, using a MAG (Metal Active Gas) welding process, so that their arcs form a weld in said groove, and automatically guiding the arcs produced by said torches by ascertaining electrical characteristics of the welding with regard to each pipe, respectively, and comparing the electrical characteristics relating to one of said pipes with the corresponding electrical characteristics relating to the other of said pipes.

29. A method of forming a deep sea pipeline or a cross country pipeline including a step of welding two pipes together, said step of welding two pipes together comprising the steps of arranging two pipes end to end, the pipes being so shaped that a circumferentially extending groove is defined between the ends of said pipes, the walls defining the sides of said groove being substantially parallel, effecting relative movement of a plurality of arc welding torches arranged directly adjacent to one another on a single carriage around said pipes and operating said torches so that their arcs form a weld in said groove, each torch being moved around said pipes with substantially the same component of velocity along the length of said groove, causing the respective positions of the arcs within said groove to oscillate between the walls of the groove in a direction having a component parallel to the axis of said pipes, and automatically guiding the arcs produced by said torches by ascertaining electrical characteristics of the welding with regard to each pipe, respectively, and comparing the electrical characteristics relating to one of said pipes with the corresponding electrical characteristics relating to the other of said pipes.

30. A method of forming a deep sea pipeline or a cross country pipeline including a step of welding two pipes together, said step of welding two pipes together comprising the steps of arranging two pipes end to end, the pipes being so shaped that a circumferentially extending groove is defined between the ends of said pipes, the angle of separation of the walls defining the groove being less than 10 degrees, effecting relative movement of a plurality of arc welding torches arranged directly adjacent to one another on a single carriage around said pipes and operating said torches so that their arcs form a weld in said groove, each torch being moved around said pipes with substantially the same component of velocity along the length of said groove, causing the respective positions of the arcs within said groove to oscillate between the walls of said groove in a direction having a component parallel to the axis of said pipe, and automatically guiding the arcs produced by said torches by ascertaining, in respect of each arc, the difference between a value representing an electrical characteristic relating to one pipe and a value representing the same electrical characteristic relating to the other pipe and then performing a correcting movement moving the position of the arc in dependence on the difference between said values, said values being determined as a result of measuring characteristics of the arc as it oscillates in the groove towards and away from the respective pipes.

31. Method of J-laying a deep sea pipeline including a welding step of welding a pipe section to the pipeline, said welding step comprising the steps of holding a free end of a pipeline, providing a pipe section and arranging said pipe section coaxially and against said free end of said pipeline, said free end of said pipeline and said end of said pipe section being so shaped that a circumferentially extending groove is defined between them, the angle of separation of the walls defining said groove being less than 10 degrees, effecting relative movement of a plurality of arc welding torches arranged directly adjacent to one another on a single carriage around said groove and operating said torches so that their arcs form a weld in said groove, each torch being moved along said groove with substantially the same component of velocity along the length of said groove, causing the respective positions of the arcs within said groove to oscillate between the walls of said groove in a direction having a component parallel to the axis of the pipe section, and automatically guiding the arcs produced by said torches by ascertaining electrical characteristics of the welding with regard to said pipe section and to said end of said pipeline, respectively, and comparing the electrical characteristics relating to one of said pipe section and said end of the pipeline with the corresponding electrical characteristics relating to the other of said pipe section and said end of the pipeline.

32. A method of forming a deep sea pipeline or a cross country pipeline including a step of welding two pipes together, said step of welding two pipes together comprising the steps of a) arranging two pipes end to end, the pipes being so shaped that a circumferentially extending groove is defined between the ends of said pipes, said groove having two circumferentially extending walls, each wall extending from a throat of said groove, the angle of separation of said walls of said groove being less than 10 degrees, b) providing a welding apparatus including a guide mounted around said groove, at least one carriage mounted on said guide for movement therealong and around said pipes under the control of a control unit having a processor, the or each carriage comprising locking and sliding devices engageable with said guide, at least two continuous-wire oscillating welding torches mounted directly adjacent to one another on the or each carriage, and a wire feeder associated with each oscillating welding torch, c) effecting relative movement of the or each carriage around said pipes and operating said torches so that their arcs form a weld in said groove, each torch being moved around said pipes with substantially the same component of velocity along the length of said groove, the arc of each torch oscillating between said walls of said groove in a direction having a component parallel to the axis of the pipes, each torch being fed with wire from the respective wire feeder associated with the torch and d) automatically guiding the arc produced by each torch by performing the following steps, in respect of each torch, ascertaining at each of a multiplicity of instants over time, electrical parameter values relating to the voltage, current intensity and voltaic arc impedance in respect of both walls of said groove during the continuous oscillating movement of said oscillating torches, calculating the difference between the electrical parameter values for one wall of said groove and for the opposite wall of said groove, comparing the values of the differences calculated, at each instant, with preset values held in said processor of said control unit to determine, at each instant, the shifting of those values, controlling the movement of each oscillating welding torch by moving, each time the shifting in relation to the respective torch exceeds a preset limit, the centre of oscillation of the torch so that the arc of said torch is directed to the centre of said throat of said groove.

33. A method of J-laying a deep sea pipeline including a step of welding two pipes together, said step of welding two pipes together comprising the steps of a) arranging two pipes end to end, the pipes being so shaped that a circumferentially extending groove is defined between the ends of said pipes, said groove having two circumferentially extending walls, each wall extending from a throat of said groove, the angle of separation of said walls of said groove being less than 6 degrees, b) providing a welding apparatus including a guide mounted around said groove on the outside of said pipes, at least one carriage mounted on said guide for movement therealong and around said pipes under the control of a control unit having a processor, the or each carriage comprising locking and sliding devices engageable with said guide, at least two continuous-wire oscillating GMAW (Gas Metal Arc Welding) torches mounted directly adjacent to one another on the or each carriage, and a wire feeder associated with each oscillating welding torch, c) effecting relative movement of the or each carriage around said pipes and operating said torches, using a MAG (Metal Active Gas) welding process, so that their arcs form a weld in said groove, each torch being moved around said pipes with substantially the same component of velocity along the length of said groove, the arc of each torch oscillating between said walls of said groove in a direction having a component parallel to the axis of the pipes, each torch being fed with wire from the respective wire feeder associated with the torch and d) automatically guiding the arc produced by each torch by performing the following steps, in respect of each torch, ascertaining at each of a multiplicity of instants over time, electrical parameter values relating to the voltage, current intensity or voltaic arc impedance in respect of both walls of said groove during the continuous oscillating movement of said oscillating torches, calculating the difference between the electrical parameter values for one wall of said groove and for the opposite wall of said groove, comparing the values of the differences calculated, at each instant, with preset values held in said processor of said control unit to determine, at each instant, the shifting of those values, controlling the movement of each oscillating welding torch by moving, each time the shifting in relation to the respective torch exceeds a preset limit, the centre of oscillation of the torch so that the arc of said torch is directed to the centre of said throat of said groove.

34. Welding apparatus for welding pipes together to form a pipeline, the apparatus comprising a carriage carrying a plurality of continuous wire arc welding torches arranged adjacent to one another, a supply of wire for each torch being mounted remotely from said carriage, each torch being provided with a water cooling system for cooling the torch during operation, a control unit for facilitating automatic guidance of the arcs produced by said torches, wherein the apparatus is so configured that it may be used to weld together two pipes laid end to end defining therebetween a groove, said apparatus being able to be so arranged that said carriage is mounted for movement around the circumference of the pipes, said control unit receives signals representing electrical characteristics of the welding with regard to each pipe, respectively, and said control unit is able to facilitate automatic guidance of the arc of each torch along said groove by comparing the signals relating to one of the pipes with the corresponding signals relating to the other of the pipes, wherein each arc is independently automatically electronically guided.

35. Welding apparatus for welding two pipes together in a method of J-laying a deep sea pipeline, said two pipes being arranged end to end, the pipes being so shaped that a circumferentially extending groove is defined between the ends of said pipes, said groove having two circumferentially extending walls, each wall extending from a throat of said groove, the angle of separation of said walls of said groove being less than 6 degrees, the apparatus comprising a guide mountable around the outside of the pipes to be welded, at least one carriage mountable on said guide for movement therealong, the or each carriage comprising locking and sliding devices engageable with said guide, at least two continuous-wire oscillating GMAW (Gas Metal Arc Welding) MAG (Metal Active Gas) welding torches mounted directly adjacent to one another on the or each carriage, each torch being so arranged that, when said guide is secured in position relative to a groove between the pipes to be welded and said at least one carriage is mounted on said guide, the arc of each torch oscillates between the walls of said groove in a direction having a component parallel to the axis of said pipes, a plurality of wire feeders for feeding the welding torches with welding wire, each oscillating welding torch being associated with a respective wire feeder, and a control unit having a processor, wherein said control unit is arranged a) to receive signals relating to the voltage, current intensity or voltaic arc impedance in respect of both walls of said groove during the welding, b) to calculate, in use, the difference between the signals received in respect of one wall of said groove and the opposite wall of said groove, c) to perform a comparison of the difference calculated with a preset value held in said processor of said control unit, and d) to control, in use, the movement of each oscillating welding torch by moving each respective torch in response to said comparison to move the torch so that the arc of said torch at the centre of oscillation of said torch is directed to the centre of said throat of said groove, whereby, in use, the arc produced by each torch is able to be automatically guided along said groove by said control unit.

36. A welding apparatus for welding pipes together to form a pipeline comprising a carriage carrying a plurality of arc welding torches, a control unit for facilitating automatic guidance of the arcs produced by the torches, wherein the apparatus is so configured that it may be used to weld together two pipes laid end to end defining therebetween a groove, by arranging the apparatus so that the carriage is mounted for movement around the circumference of the pipes, the control unit receives signals representing electrical characteristics of the welding with regard to each pipe, respectively, whereby the control unit facilitates automatic guidance of the arc of each torch along the groove by comparing the signals relating to one of the pipes with the corresponding signals relating to the other of the pipes, wherein an angle of separation of walls defining the groove is less than 10 degrees.

37. A method of welding two pipes together, the method comprising the steps of:

arranging two pipes end to end, the pipes being so shaped that a circumferentially extending groove is defined between the ends of the pipes, effecting relative movement of a plurality of arc welding torches at substantially the same speed around the pipes and operating the torches so that their arcs form a weld in the groove, automatically guiding the arcs produced by the torches by ascertaining electrical characteristics of the welding with regard to each pipe, respectively, and comparing the electrical characteristics relating to one of the pipes with the corresponding electrical characteristics relating to the other of the pipes, wherein the angle of separation of the walls defining the groove is less than 10 degrees.

* * * * *